(12) United States Patent
Chiu et al.

(10) Patent No.: US 9,117,022 B1
(45) Date of Patent: Aug. 25, 2015

(54) HIERARCHICAL ARBITRATION

(75) Inventors: Gordon Raymond Chiu, North York (CA); John Stuart Freeman, Toronto (CA)

(73) Assignee: Altera Corporation, San Jose, CA (US)

(*) Notice: Subject to any disclaimer, the term of this patent is extended or adjusted under 35 U.S.C. 154(b) by 554 days.

(21) Appl. No.: 13/352,090

(22) Filed: Jan. 17, 2012

Related U.S. Application Data

(60) Provisional application No. 61/544,951, filed on Oct. 7, 2011.

(51) Int. Cl.
 *G06F 13/36* (2006.01)
 *G06F 13/364* (2006.01)

(52) U.S. Cl.
 CPC .................................. *G06F 13/364* (2013.01)

(58) Field of Classification Search
 CPC ..... G06F 13/364; G06F 13/36; G06F 3/0383; G06F 13/3625
 See application file for complete search history.

(56) References Cited

U.S. PATENT DOCUMENTS

| | | | | |
|---|---|---|---|---|
| 6,311,249 B1* | 10/2001 | Min et al. | ...... | 710/111 |
| 7,143,219 B1* | 11/2006 | Chaudhari et al. | ...... | 710/111 |
| 7,200,699 B2* | 4/2007 | Bose et al. | ...... | 710/120 |
| 7,290,075 B2* | 10/2007 | Bruce et al. | ...... | 710/113 |
| 7,447,817 B1* | 11/2008 | Sripada | ...... | 710/120 |
| 7,657,681 B2* | 2/2010 | Tanaka | ...... | 710/240 |
| 8,370,551 B2* | 2/2013 | Ohmacht et al. | ...... | 710/110 |
| 2003/0172212 A1* | 9/2003 | Lavigne | ...... | 710/111 |
| 2007/0260792 A1* | 11/2007 | Pathak et al. | ...... | 710/113 |
| 2008/0091866 A1* | 4/2008 | Cox et al. | ...... | 710/243 |
| 2010/0318706 A1* | 12/2010 | Kobayashi | ...... | 710/114 |

\* cited by examiner

*Primary Examiner* — Raymond Phan
(74) *Attorney, Agent, or Firm* — Fletcher Yoder, P.C.

(57) ABSTRACT

Systems and methods for increasing speed and reducing area for arbitration logic in an integrated circuit (IC) are provided. For example, in one embodiment, a method includes arbitrating at least one master request in a first level of arbitration blocks. A second level of arbitration blocks arbitrates at least two arbitration blocks from the first level. A first level of multiplexers multiplex at least one master payload based at least in part upon the arbitration of the first level of arbitration blocks. A second level of multiplexers multiplex at least two signals propagated from the first level of multiplexers.

22 Claims, 5 Drawing Sheets

HIERARCHICAL ARBITRATION

BACKGROUND

The present disclosure relates generally to integrated circuits, such as field programmable gate arrays (FPGAs). More particularly, the present disclosure relates to enhancing speed and reducing the amount of programmable space used by arbitration logic in an integrated circuit (e.g., an FPGA).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Integrated circuits (ICs) take a variety of forms. For instance, field programmable gate arrays (FPGAs) are integrated circuits that are intended as relatively general-purpose devices. FPGAs may include logic that may be programmed (e.g., configured) after manufacturing to provide any desired functionality that the FPGA is designed to support. Thus, FPGAs contain programmable logic, or logic blocks, that may be configured to perform a variety of functions on the FPGAs, according to a designer's design. Additionally, FPGAs may include input/output (I/O) logic, as well as high-speed communication circuitry. For instance, the high-speed communication circuitry may support various communication protocols and may include high-speed transceiver channels through which the FPGA may transmit serial data to and/or receive serial data from circuitry that is external to the FPGA.

In network or bus topologies, components receiving commands (e.g., requests) from multiple masters may utilize arbitration to grant access to only a single master data payload at a time. Accordingly, an FPGA may include an arbitration scheme that provides shared access of the component with multiple masters. However, such arbitration schemes may utilize a significant portion of the FPGA programmable logic. Further many arbitration schemes cannot be sub-divided, causing the arbitration schemes to be on the critical path of many FPGA designs, often being a bottle-neck. Thus, current arbitration schemes of FPGAs are problematic, making it challenging for FPGAs to achieve improved system on chip design performance.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to systems, methods, and devices for improving system on chip design performance through enhanced arbitration methods in a designer's FPGA design. In particular, the present embodiments may provide FPGAs the ability to increase maximum operating frequency of the FPGA, commonly referred to as fmax, and decrease the area used by arbitration through hierarchically arbitrating the masters using several levels of arbitration. For example, in one embodiment, an integrated circuit device implementing such features may be configured to arbitrate multiple master requests using multiple arbitration blocks on a first level. Each arbitration block on the first level may arbitrate between two masters. A second level of arbitration blocks may be utilized to arbitrate between the first level arbitration blocks. Each arbitration block on the second level may arbitrate between two arbitration blocks on the first level. Further, the integrated circuit device may be configured to hierarchically multiplex the master payloads in parallel with the hierarchical arbitration of the master requests. A first level of multiplexers may multiplex master payloads based upon the results of the first level arbitration. Each of the first level multiplexers may multiplex between two master payloads. A second level of multiplexers may multiplex the payloads sent by the first level of multiplexers. Each multiplexer on the second level may multiplex between two multiplexers on the first level. Additional levels of arbitration blocks and multiplexers may be added until a single arbitration block and a single multiplexer block are present on a level.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in further detail below, embodiments of the present disclosure relate generally to circuitry for hierarchically arbitrating masters with components of a designer's integrated circuit (IC) design. In particular, IC designs that include hierarchical arbitration logic may result in the ICs that operate more efficiently (e.g., may operate at higher operating speed ("fmax") and/or reduce area usage). For instance, when the IC design utilizes traditional round-robin arbitration implemented with carry chains, a significant portion of programmable logic may be utilized to store the arbitration logic. Further, in many such IC designs, the carry-chain arbitration is on the critical path (e.g., the path defining a clock delay) of the IC design. In contrast, the present embodiments describe various techniques for implementing hierarchical arbitration logic, which may utilize less chip area, but may also have a shorter critical path, thus improving the IC design. Certain particular examples presented below will relate to field programmable gate arrays (FPGAs). However, it should be understood that the present disclosure relates to any integrated circuits with suitable circuitry.

Figure 1:
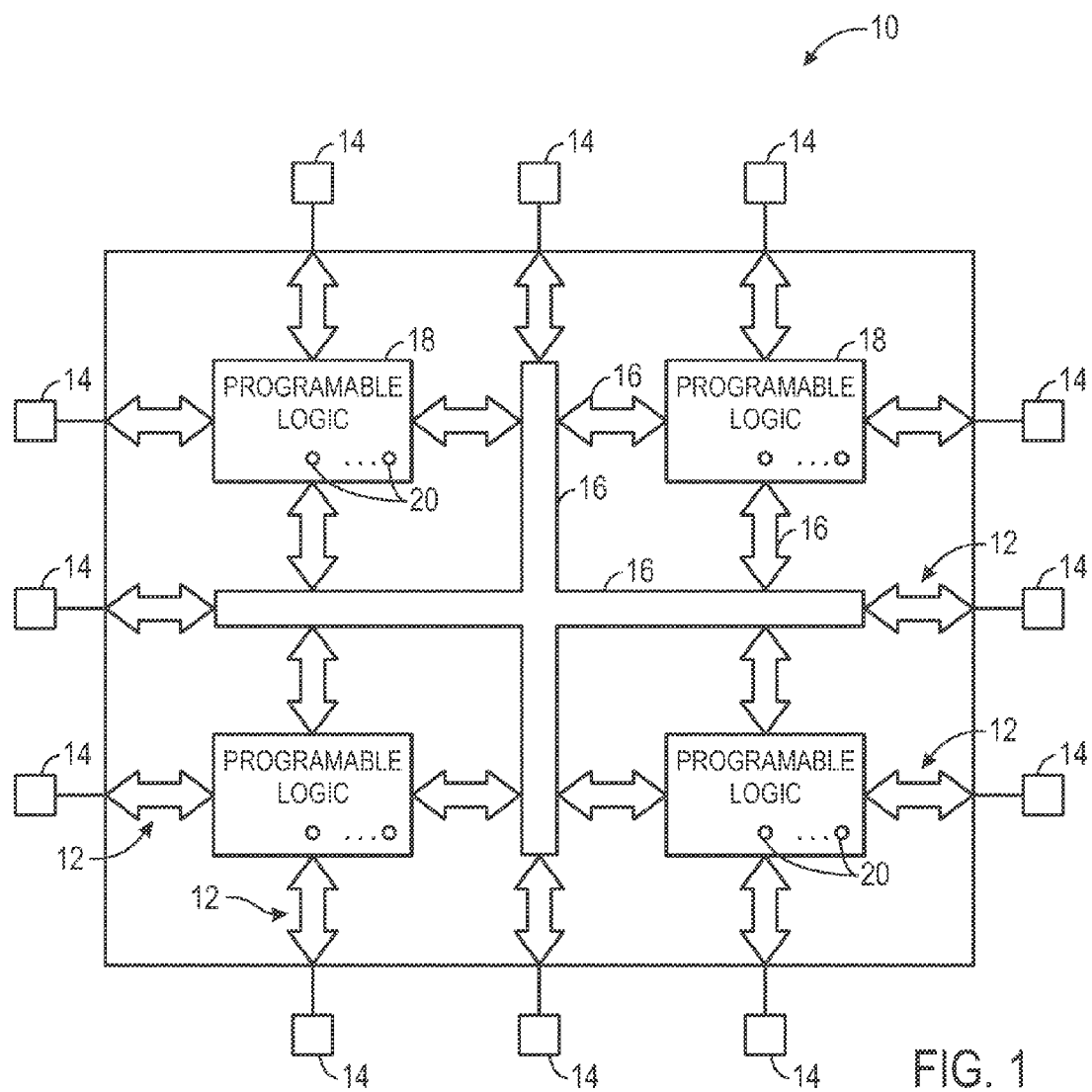
FIG. 1 is a block diagram of a programmable logic device that may include logic configured to hierarchically arbitrate masters, in accordance with aspects of the present disclosure.

With the foregoing in mind, FIG. 1 illustrates an integrated circuit (IC) device 10, which may be a programmable logic device, such as a field programmable gate array (FPGA). For the purposes of this example, the device 10 is referred to as an FPGA, though it should be understood that the device may be any type of programmable logic device. As shown, FPGA 10 may have input/output circuitry 12 for driving signals off of device 10 and for receiving signals from other devices via input/output pins 14. Interconnection resources 16, such as global and local vertical and horizontal conductive lines and buses, may be used to route signals on device 10. Additionally, interconnection resources 16 may include fixed interconnects (conductive lines) and programmable interconnects (i.e., programmable connections between respective fixed interconnects). Programmable logic 18 may include combinational and sequential logic circuitry. For example, programmable logic 18 may include look-up tables, registers, and multiplexers. In various embodiments, the programmable logic 18 may be configured to perform a custom logic function. The programmable interconnects associated with interconnection resources may be considered to be a part of programmable logic 18. As discussed in further detail below, the FPGA 10 may include arbitration circuitry configured to hierarchically arbitrate multiple masters, which may improve FPGA operation.

Programmable logic devices, such as FPGA 10, may contain programmable elements 20 with the programmable logic 18. For example, after manufacturing, a designer (e.g., a customer) may program (e.g., configure) the programmable logic 18 to perform one or more desired functions. By way of example, some programmable logic devices may be programmed by configuring their programmable elements 20 using mask programming arrangements, which is performed during semiconductor manufacturing. Other programmable logic devices are configured after semiconductor fabrication operations have been completed, such as by using electrical programming or laser programming to program their programmable elements 20. In general, programmable elements 20 may be based on any suitable programmable technology, such as fuses, antifuses, electrically-programmable read-only-memory technology, random-access memory cells, mask-programmed elements, and so forth.

Most programmable logic devices may be electrically programmed. With electrical programming arrangements, the programmable elements 20 may be formed from one or more memory cells. For example, during programming, configuration data is loaded into the memory cells 20 using pins 14 and input/output circuitry 12. In one embodiment, the memory cells 20 may be implemented as random-access-memory (RAM) cells. The use of memory cells 20 based on RAM technology, as described herein, is intended to be only one example. Further, because these RAM cells are loaded with configuration data during programming, they are sometimes referred to as configuration RAM cells (CRAM). These memory cells 20 may each provide a corresponding static control output signal that controls the state of an associated logic component in programmable logic 18. For instance, in some embodiments, the output signals may be applied to the gates of metal-oxide-semiconductor (MOS) transistors within the programmable logic 18.

The circuitry of FPGA 10 may be organized using any suitable architecture. As an example, the logic of FPGA 10 may be organized in a series of rows and columns of larger programmable logic regions, each of which may contain multiple smaller logic regions. The logic resources of FPGA 10 may be interconnected by interconnection resources 16 such as associated vertical and horizontal conductors. For example, in some embodiments, these conductors may include global conductive lines that span substantially all of FPGA 10, fractional lines such as half-lines or quarter lines that span part of device 10, staggered lines of a particular length (e.g., sufficient to interconnect several logic areas), smaller local lines, or any other suitable interconnection resource arrangement. Moreover, in further embodiments, the logic of FPGA 10 may be arranged in multiple levels or layers in which multiple large regions are interconnected to form still larger portions of logic. Still further, other device arrangements may use logic that is not arranged in a manner other than rows and columns.

As discussed above, the FPGA 10 may allow a designer to create a customized design capable of executing and performing customized functionalities. Typically, a given FPGA design may have a unique number of masters that initiate requests of components of the FPGA design. As will be discussed in more detail with regards to FIG. 2, the masters may need to be arbitrated through logic on the FPGA 10.

Figure 2:
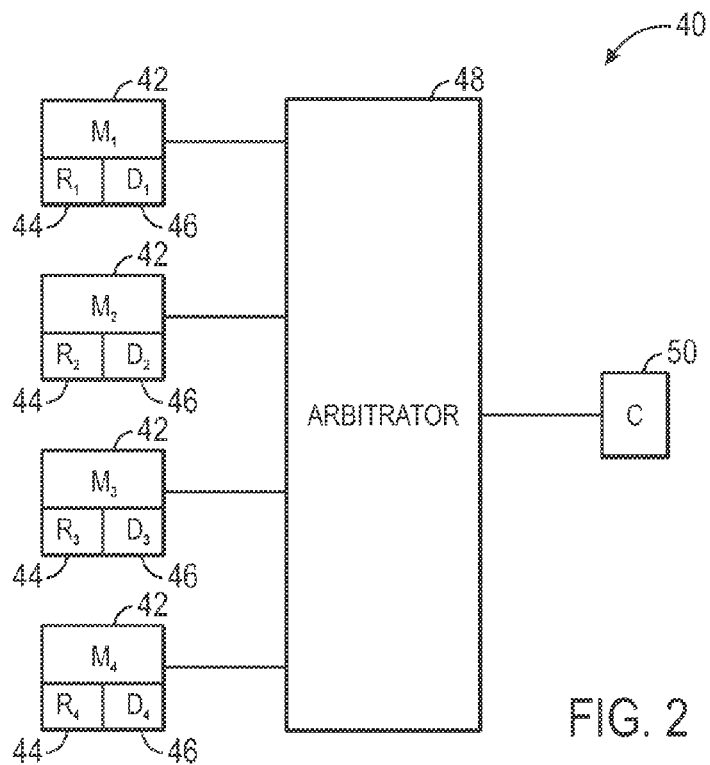
FIG. 2 is a block diagram illustrating the relationships between a set of masters, an arbitrator, and a component receiving requests from multiple masters.

Referring now to FIG. 2, a block diagram 40 illustrates the relationships between multiple masters 42, an arbitrator 48, and a component 50 receiving requests from the multiple masters 42. As illustrated in FIG. 2 some designs may include multiple masters 42 that initiate requests 44 of the master's payload 46 to a component 50 of the FPGA design 40. When multiple masters 42 are enabled to make requests 44 of the component 50, an arbitrator 48 may be utilized to prevent multiple masters 42 from making requests 44 of the component 50 simultaneously. In other words, the arbitrator 48 ensures that access of the component 50 is granted to a single master at a time.

Typically, a "fair" arbitration scheme is implemented, which provides an equal share of access to the component 50 by each of the multiple masters 42. As will be discussed in more detail below, fair arbitration may also be weighted, such as by providing one master (e.g., M1) a greater share of access to the component 50, while providing equal shares of access to the other masters (e.g., M2, M3, and M4). One method of fair arbitration is a round-robin scheme. The round-robin scheme assigns equal shares of access of the component 50 to each of the multiple masters 42 in a sequential and circular order. For example, in FIG. 2, the arbitrator 48, using a round-robin scheme, may permit access to M1, then M2, then M3, then M4, and then back to M1.

Figure 3:
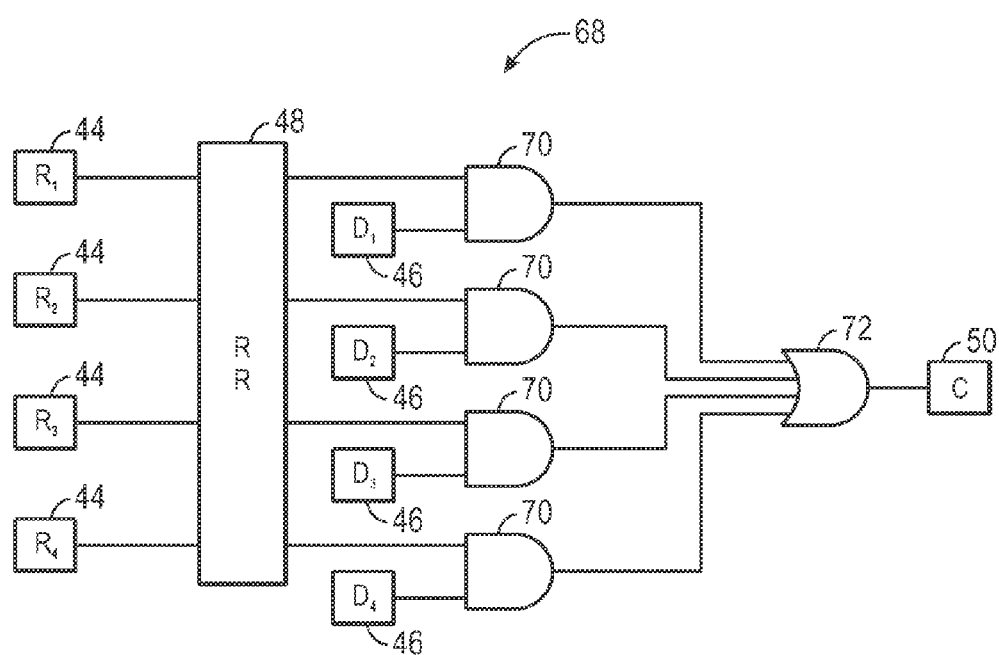
FIG. 3 is a block diagram illustrating an example of a carry-chain arbitration scheme.

FIG. 3 illustrates a non-hierarchical arbitration scheme 68 using round-robin arbitration. Generally, the round-robin arbitrator 48 may include a carry-chain that determines which of the requests 44 will be granted access to the component 50. For example, the round-robin arbitrator 48 may include a large ripple carry adder implemented to grant access in a sequential fashion. The ripple carry adder may provide a grant-bit associated with one of the requests 44 at a time. Each request 44 is associated with a payload 46. Upon a request's grant bit being provided to an AND gate 70 associated with the request 44 and the payload 46, the payload 46 with the grant bit will be granted access to the component 50 through the OR gate 72.

When relying on carry chains to implement arbitration, it may be difficult to pipeline (e.g., allowing overlapping execution of multiple instructions). For example, pipelining is typically enabled through dividing circuitry into stages such that multiple actions may take place at one time. It may be very difficult to break a long carry chain to insert registers at intermediate stages of the carry chain implementation such that pipelining may occur. Additionally, the carry chain logic may utilize a large area of programmable logic and/or may be inefficient.

Figure 4:
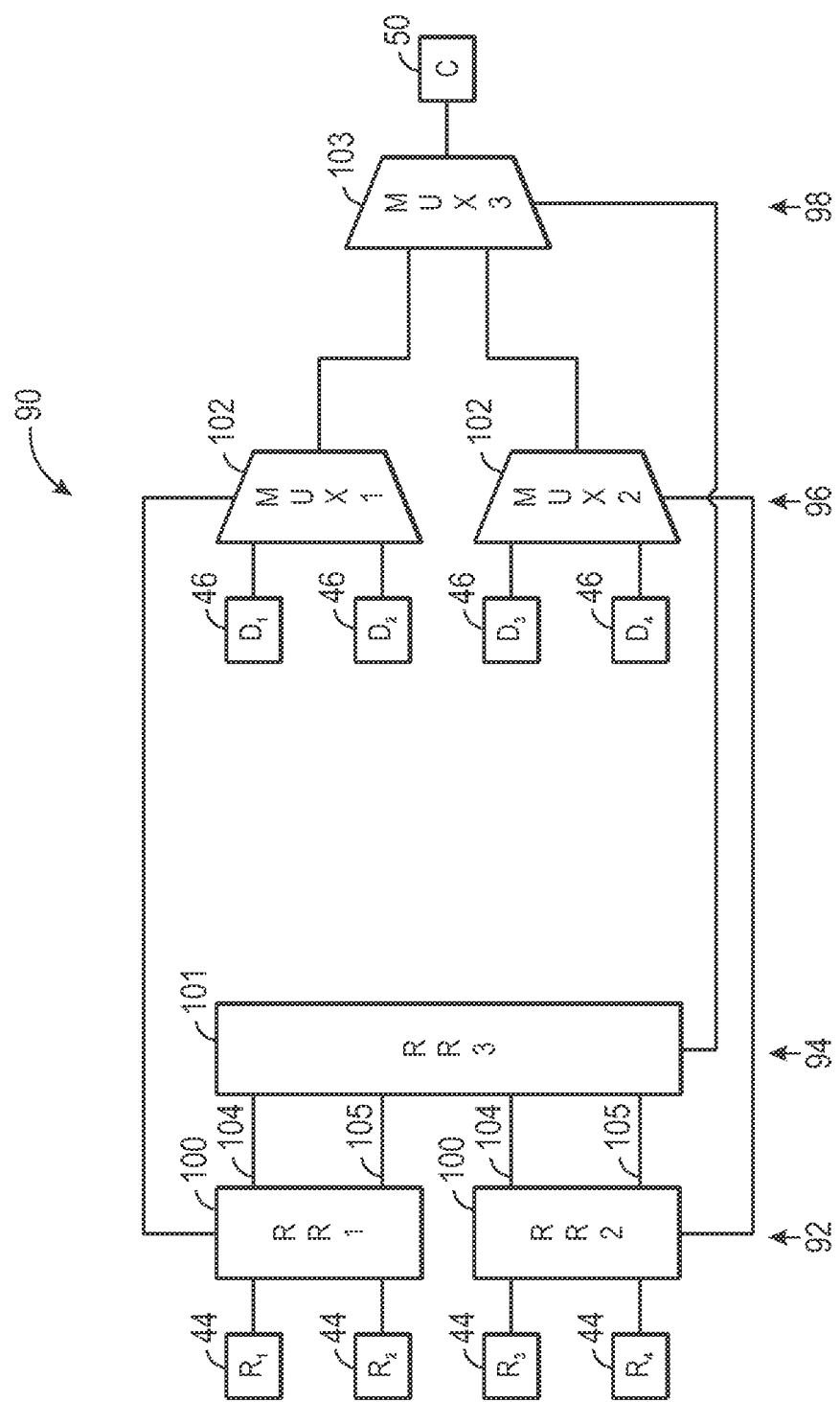
FIG. 4 is a block diagram of a hierarchical arbitration scheme, in accordance with an embodiment.

To enhance the arbitration scheme, hierarchical arbitration may be implemented. FIG. 4 is a block diagram of a hierarchical arbitration scheme 90, in accordance with an embodiment. As shown in FIG. 4, multiple levels of arbitration blocks 92 and 94 may be utilized to hierarchically arbitrate the requests 44 of the masters. Further, multiple levels of multiplexers 96 and 98 may be used to multiplex the payloads 46 of the masters. The requests 44 and payloads 46 may be arbitrated and multiplexed hierarchically to a binary encoding (e.g., determinable by a "1" or "0"), which may offer significant performance increases. For example, the critical path may be reduced, explicit calculation of an entire grant signal may not be needed, the programmable logic area utilized may be decreased, and/or finer grain pipelining may be possible. However, in some embodiments, the grant signal may be provided by augmenting the payloads 46 to include encoded master identifiers.

In the hierarchical arbitration scheme 90, the first level 92 of arbitration blocks 100 may include an arbitration block 100 for every two masters 44 present in the FPGA design. For example, as illustrated, four masters (e.g., four master requests 44 (R1-R4) and four master payloads 46 (D1-D4)) are present. Thus, two arbitration blocks 100 are useful for arbitrating the master requests 44 at the first level 92. In the illustrated embodiment, two masters provide master requests R1 and R2 to an arbitration block RR1 and two masters provide requests R3 and R4 to a separate arbitration block RR2 on the same level 92. An additional level 94 of arbitration blocks 101 is provided to arbitrate the previous level 92 of arbitration blocks 100. In the present embodiment, each arbitration block 101 in the additional level 94 arbitrates between two arbitration blocks 100 in the previous level 92. For example, because the first level 92 contains two arbitration blocks RR1 and RR2, only one arbitration block 101 is needed on the additional level 94. As will be discussed in more detail with regards to FIG. 5, additional levels of arbitration may be added until only one arbitration block 101 is contained on a final level. For example, for eight master requests, a first level of arbitration blocks may include four arbitration blocks (each receiving two of the requests), a second level of arbitration blocks may include two arbitration blocks (each receiving the out of two of the four arbitration blocks from the first level), and a third level may include a signal arbitration block receiving the outputs of the two arbitration blocks from the second level.

Hierarchical multiplexing works in a similar fashion to the arbitration discussed above. A first level 96 of multiplexers 102 may include one multiplexer 102 for every two master payloads 46 in the FPGA design. The master payloads 46 are multiplexed based upon the immediate result of the arbitration of a corresponding arbitration block 100. For example, as illustrated in FIG. 4, multiplexer MUX1 on the first level 96 of multiplexers 102 is associated with arbitration block RR1 on the first level 92 of arbitration blocks 100. Multiplexer MUX2 is associated with arbitration block RR2. An additional level 98 of multiplexers 103 is provided to multiplex the signals output from the previous level 96 of multiplexers 102. Each multiplexer 103 in the additional level 98 multiplexes signals from two multiplexers 102 in the previous level 96. For example, because the first level 96 contains two multiplexers MUX1 and MUX2, one multiplexer MUX3 is provided on the additional level 98. Multiplexer MUX3 is associated with arbitration block RR3 and is configured to multiplex data payload signals based upon the immediate result of the arbitration of arbitration block RR3. As will be discussed in more detail with regards to FIG. 5, additional levels of multiplexing may be added until only one multiplexer 103 is contained on a level. Once the final multiplexer 103 multiplexes its input signals and provides an output, the payload 46 of one master is granted to the component 50.

In some embodiments, the hierarchical arbitration scheme includes arbitration blocks 100 that provide two outputs 104 in the form of a Shannon expansion. For example, one output 104 provides an arbitration output based upon the assumption that the arbitration blocks 100 in the subsequent levels 94 will select the current arbitration block 100 and another output 105 provides an arbitration output based upon the assumption that the remaining levels of arbitration blocks 100 will not select the current arbitration block 100. The next level 94 of arbitration blocks 100 takes the shannonized outputs 104 and 105 from the previous level 92 and arbitrates another set of shannonized outputs 104 based upon the same assumptions. The arbitration blocks 100 are generated until only one arbitration block 101 exists in a level. The first level 96 of multiplexers 102 multiplex between two payload 46 data signals based upon a local priority selection bit. A payload 46 data signal is propagated through the subsequent levels of multiplexers 102 until only one multiplexer 103 remains. At that point, the propagated master payload 46 is provided access to the component 50.

The hierarchal arbitration and multiplexing techniques described herein may be expressed using a hardware description language, such as Verilog or VHDL. Table 1 below provides an embodiment of hierarchical arbitration and multiplexing implemented using Verilog. In the provided implementation, "s1," "c1," "s0," and "c0" represent the shannonized outputs 104 from two arbitration blocks 100 on a previous level (e.g., level 92). "sd1," "cd1," "sd0," and "cd0" represent the propagated payload data signals from the multiplexers 102 in the previous level (e.g., level 96). Additionally, "c" and "s" represent the arbitration outputs 104 and 105, one assuming that the arbitration block will be selected by the remaining arbitration blocks and the other assuming that the arbitration block will not be selected by the remaining arbitration blocks. Further, "cd" and "sd" represent the propagated data payload 46 signals from the multiplexers 102. The Verilog code is implemented in such a manner that it can be recursively instantiated until a single master is arbitrated. For example, in certain embodiments, a parameterized hardware description language, may recursively loop to generate the levels of the hierarchy. Further, in some embodiments, one bit of a priority grant signal may be used to determine a local priority of arbitration in the arbitration block.

TABLE 1

Example of Hierarchal Arbitration using Verilog

```
assign c = (grant_bit ? c1 : (c0 | s1));
assign s = s1 : s0;
assign cd = (grant_bit? Cd1 : (c0 ? cd0 : cd1));
assign sd = s0 ? sd0 : sd1;
```

As can be further appreciated, FPGA design software, such as Quartus® from Altera Corporation of San Jose, Calif., may enable programming of intellectual property (IP) cores (e.g., functional configuration data streams) into the FPGA 10. For instance, one IP-core may include the hierarchical arbitration scheme 90 discussed above. The FPGA design software may also include a user interface (e.g., a wizard) that allows a user to incorporate the hierarchical arbitration scheme 90 into the user's FPGA design. For example, the FPGA software may include a drag and drop interface that allows a designer to incorporate a hierarchical arbitration IP-core into an FPGA design simply by selecting the hierarchical arbitration scheme 90 in the design software and moving it into the FPGA logic.

The FPGA software may additionally include functionality to model a network bus based upon a number of masters 42 and components 50 in a designer's FPGA design. For instance, the FPGA software may analyze the FPGA design to determine whether or not to use a hierarchical arbitration scheme 90. In some embodiments, the FPGA software may determine whether or not to use a hierarchical arbitration scheme 90 based upon the number of masters 42 in the system and/or the desirability of pipelining in the FPGA design. For example, if an FPGA design has a large number of masters 42 (e.g., 9 or more masters) and/or no pipelining is desired, the FPGA software may choose to implement a non-hierarchical arbitration scheme 48. When the number of masters 42 is low (e.g., less than 9) and/or pipelining is desirable, the FPGA software may determine to use a hierarchical arbitration scheme 90. Other metrics and/or properties of the FPGA design may be useful in determining whether or not to use a hierarchical arbitration scheme 90. For example, the FPGA software may determine to use a hierarchical arbitration scheme 90 to preserve the amount of unused programmable logic in the FPGA. In some embodiments, as will be described in more detail below with regards to FIG. 6, it may be desirable to implement weighted arbitration that provides a higher share of access of a component to one or more specific masters, with the remaining masters having a lesser but equal share of access to the component. Such weighted arbitration may be more easily synthesized by the FPGA software using the hierarchical arbitration scheme 90. Thus, the FPGA software may determine to use the hierarchical arbitration scheme 90 when a weighted arbitration scheme is desired.

Figure 5:
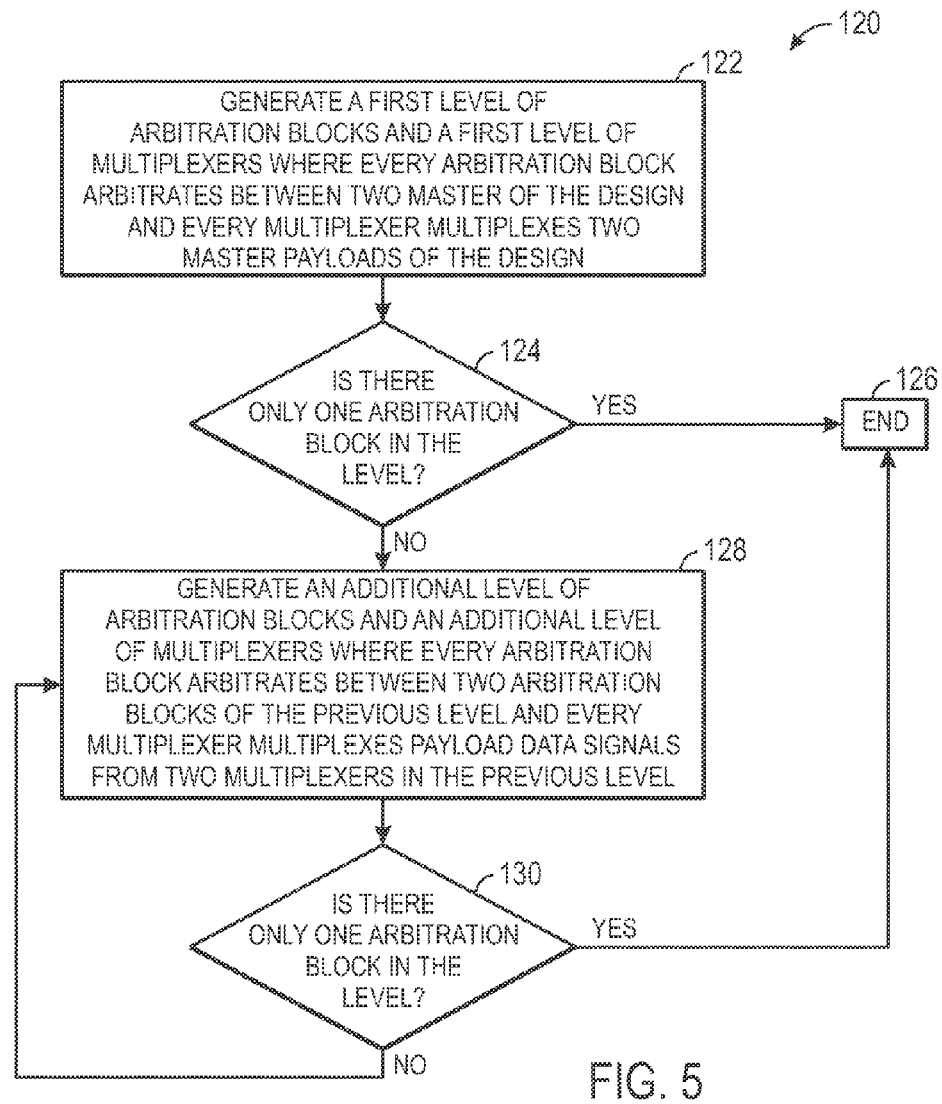
FIG. 5 depicts a flowchart illustrating a process for generating a hierarchical arbitration scheme, in accordance with an embodiment of the present disclosure.

When the FPGA software determines that a hierarchical arbitration scheme should be implemented, the FPGA software may add the hierarchical arbitration scheme to the FPGA design. Alternatively, as discussed above, a hardware description language may generate the hierarchical arbitration scheme. FIG. 5 is a flow diagram illustrating a process 120 for generating a hierarchical arbitration scheme 90. A first level of arbitration blocks is generated (block 122). The number of arbitration blocks generated on the first level depends on the number of masters to be arbitrated. Each arbitration block arbitrates two masters, thus providing a binary encoded arbitration. Thus, the number of arbitration blocks in the first level will be half of the number of masters. In other embodiments, as will be described in more detail with regards to FIG. 6, some arbitration blocks may arbitrate fewer or more than two masters.

To determine if a second level of arbitration is necessary, the FPGA software or hardware description language determines if there is only one arbitration block on the first level (block 124). For example, if there were only two masters in the FPGA design, only one arbitration block would be generated on the first level. If there is only one arbitration block, the generation of the hierarchical arbitration scheme is complete and the process is ended (block 126). If, however, more than one arbitration block is on the generated level, an additional level of arbitration blocks is generated (block 128). Each of the arbitration blocks in the additional level arbitrates between two arbitration blocks of the previous level. Thus, the number of arbitration blocks in the additional level will be half the number of blocks in the previous level. The FPGA software or hardware description language may then determine if there is only one block in the newly generated level (block 130). If there is only one block, the generation of the hierarchical arbitration scheme is complete and may be ended (block 126). If however, there are more than one arbitration blocks in the level, block 128 is repeated, creating additional arbitration block levels until only one arbitration block is in a level. At that point, the hierarchical arbitration scheme is fully generated and may be added to the FPGA design by the FPGA software.

Figure 6:
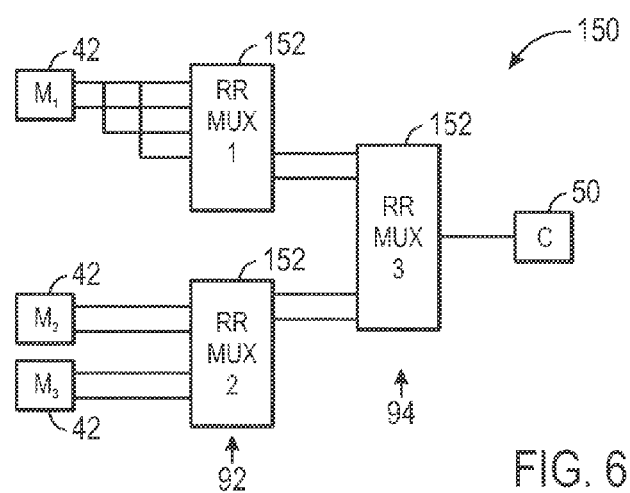
FIG. 6 is a block diagram showing an embodiment of a weighted hierarchical arbitration scheme, in accordance with an embodiment.

As previously discussed, in some embodiments, the hierarchical arbitration scheme may be used to more easily synthesize a weighted arbitration scheme through the FPGA software. FIG. 6 illustrates a weighted arbitration scheme 150 implemented through a hierarchical arbitration scheme. For simplicity, FIG. 6 illustrates hierarchical arbitration and multiplexing blocks 152 that include both the master request arbitration and the master payload multiplexing. The weighted arbitration scheme 150 may provide more access of a component 50 by one master 42 than other masters 42. For example, in the embodiment depicted in FIG. 6, master M1 is granted twice the amount of access to the component 50 as compared to masters M2 and M3.

In non-hierarchical arbitration schemes, a weighted arbitration scheme may require the use of a separate counter to control arbitration weights. For example, the counter would be used to determine a disproportionate share of access for M1. By using the hierarchical arbitration scheme to implement the weighted arbitration, no such counter may be needed. Further, the weighted arbitration scheme 150 may more easily be synthesized through using the hierarchical arbitration scheme. For example, in the hierarchical arbitration scheme 90 discussed above, each arbitration block 100 in the first level 92 of arbitration blocks 100 receives inputs from two masters 42. In the weighted arbitration scheme 150, one or more one or more arbitration and multiplexing blocks 152 in the first level 92 may take two sets of inputs from one master 42 designated to have increased access over the other masters 42. In the example depicted in FIG. 6, master M1 has been granted access to the component 50 twice as often as masters M2 and M3. In the present embodiment the multiplexing block RRMUX1 receives the master M1 as both of its inputs. Thus, the arbitration and multiplexing block RRMUX1 will always arbitrate and multiplex a grant for master M1. Arbitration and multiplexing block RRMUX2, receiving inputs from both masters M2 and M3, will alternate grants between the masters M2 and M3. Arbitration and multiplexing block RRMUX3 will arbitrate and multiplex between arbitration and multiplexing blocks RRMUX1 and RRMUX2, arbitrating and multiplexing a grant for master M1 twice as many times as arbitrating a grant for masters M2 and M3.

Figure 7:
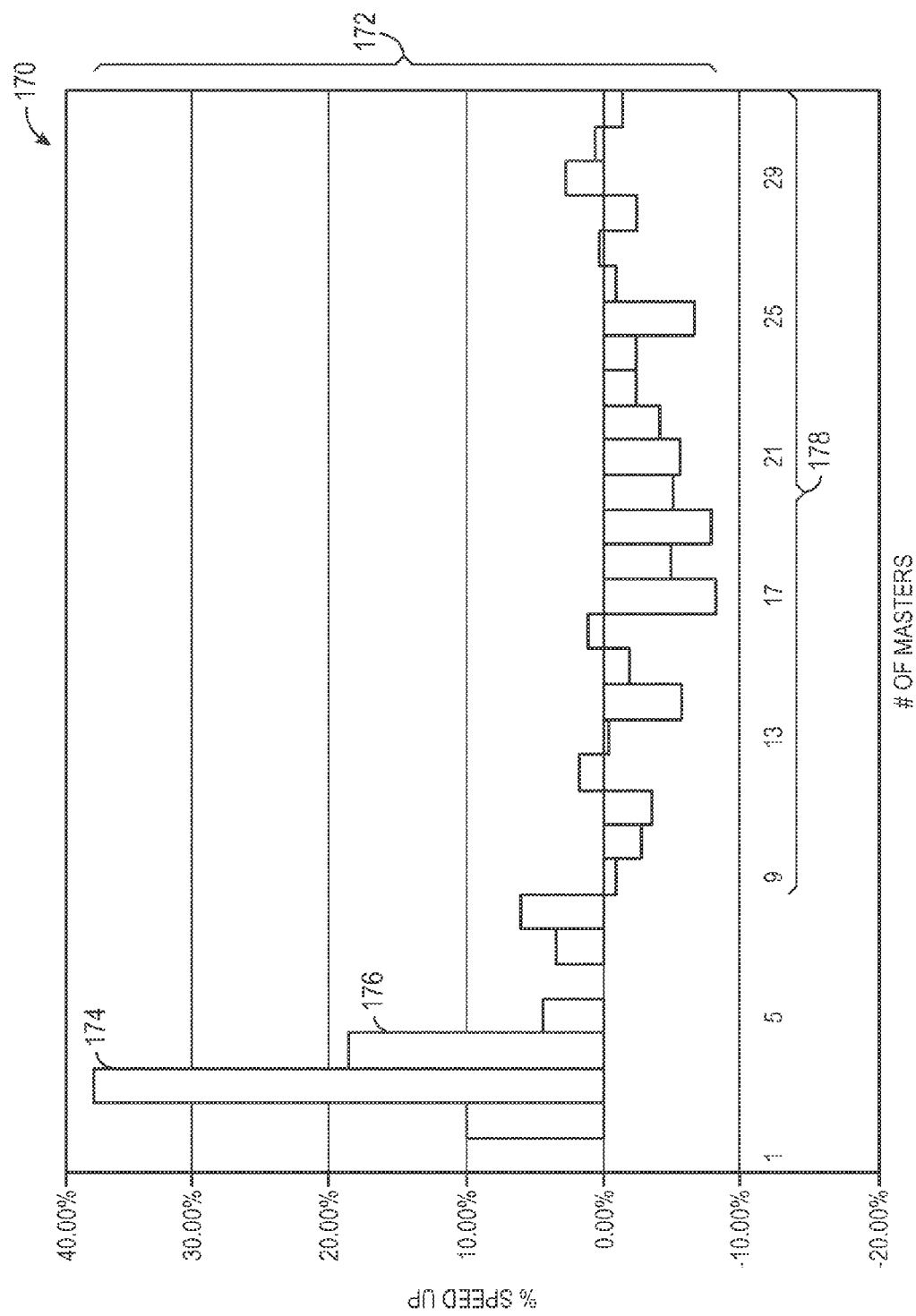
FIG. 7 is a chart illustrating a performance comparison of an FPGA that includes hierarchical arbitration in accordance with embodiments of the present disclosure, with respect to an FPGA that includes non-hierarchical arbitration.

FIG. 7 illustrates measured performance variances for a set of synthetic benchmarks for FPGA designs with a number of masters ranging from 1 to 32. For instance, the chart 170 depicted in FIG. 7 provides a comparison of percentages of maximum operating frequency (FMAX) speedup 172 of an FPGA 10 through using a hierarchical arbitration scheme over a non-hierarchical arbitration scheme for FPGA designs. The benchmark tests were completed for FPGA designs containing between 1 and 32 masters. In this particular example, an FPGA design 174 with 3 masters produced an approximately 35% increase in the FMAX, resulting from a reduction in the critical path length of approximately 400-800 picoseconds. Further, an FPGA design 176 with 4 masters provided an approximately 20% increase in the FMAX. As illustrated, FPGA designs 178 with 9 or more masters may produce a slight decrease in performance. However, the hierarchical arbitration scheme may result in a reduction of utilized programming logic over non-hierarchical arbitration schemes, and thus, may still be desirable in certain FPGA designs. For example, in the synthetic benchmarks, the average area of programmable logic was reduced by approximately 6% by utilizing the hierarchical arbitration scheme.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A method of arbitrating a plurality of masters in an integrated circuit (IC), the method comprising:
   arbitrating, via at least two arbitration blocks in a first level of arbitration blocks, at least two master requests in the IC;
   arbitrating, via at least one arbitration block in a second level of arbitration blocks, at least two output signals of the first level arbitration blocks;
   multiplexing, via at least two multiplexers in a first level of multiplexers, at least two master payloads in the IC based at least in part upon the arbitration of the first level of arbitration blocks; and
   multiplexing, via at least one multiplexer in a second level of multiplexers, at least two signal payloads propagated from the first level of multiplexers.

2. The method of claim 1, wherein arbitration in the first level of arbitration blocks occurs in parallel with multiplexing in the first level of multiplexers, and arbitration in the second level of arbitration blocks occurs in parallel with multiplexing via the at least one multiplexer in the second level of multiplexers.

3. The method of claim 1, wherein arbitration in the first level of arbitration blocks comprises a round-robin arbitration scheme.

4. The method of claim 1, wherein arbitration in the first level of arbitration blocks comprises a binary encoding for each of the at least two arbitration blocks.

5. The method of claim 1, further comprising arbitration in one or more additional levels of arbitration blocks and multiplexing in one or more additional levels of multiplexers until a single output signal is found on a level of arbitration blocks and a single output signal payload is found on a level of multiplexers.

6. The method of claim 1, wherein arbitration in the first level of arbitration blocks comprises arbitrating a single master request in at least one arbitration block in the first level of arbitration blocks and arbitrating two master requests in at least another arbitration block in the first level of the arbitration blocks.

7. The method of claim 1, wherein arbitration in the first level of arbitration blocks comprises arbitrating two master requests.

8. The method of claim 1, further comprising generating an encoded master grant by augmenting the at least two master payloads to include encoded master identifiers.

9. The method of claim 1, comprising:
   arbitrating in one or more additional levels of arbitration blocks and multiplexing in one or more additional levels of multiplexers;
   wherein a first additional level of arbitration blocks comprises a number of arbitration blocks that is half that of the number of the plurality of masters; and
   each subsequent additional level of arbitration blocks comprises a number of arbitration blocks that is half that of the prior additional level, until a single output signal is found on a level of arbitration blocks.

10. An integrated circuit (IC) device, comprising:
    programmable logic configured to store a programmable design, wherein the programmable design is configured to implement customized functions on the IC device;
    a plurality of masters; and
    hierarchical arbitration circuitry comprising:
    a hierarchy of arbitration blocks with a plurality of levels, wherein each arbitration block is configured to output a pair of Shannon expansion outputs comprising:
    a first output, wherein the first output is determined based upon an assumption that arbitration blocks on a subsequent level will select the arbitration block as the highest priority arbitration block; and
    a second output, wherein the second output is determined based upon an assumption that arbitration blocks on a subsequent level will not select the arbitration block as the highest priority arbitration block;
    wherein an initial level of arbitration blocks receives an input from the plurality of masters;
    wherein a last level of arbitration blocks comprises a single arbitration block that selects for outputting a data payload of one of the plurality of masters based at least in part upon the first and second outputs of each of the arbitration blocks in the hierarchy.

11. The IC device of claim 10, wherein the programmable logic comprises the hierarchical arbitration circuitry.

12. The IC device of claim 10, wherein the hierarchical arbitration circuitry is configured to reduce a critical path length of the IC device.

13. The IC device of claim 10, comprising one or more registers disposed at the first output and the second output of one or more of the arbitration blocks to enable pipelining at one or more of the plurality of levels.

14. The IC device of claim 10, wherein at least one arbitration block in the first level is configured as a weighted arbitration block that receives an input from one master and at least one arbitration block is configured as a non-weighted arbitration block that receives an input from two masters, and wherein the masters providing input to the weighted arbitration blocks are at least twice as likely to be selected as an output by the last level of arbitration blocks in comparison to the non-weighted arbitration blocks.

15. The IC device of claim 10, wherein each of the arbitration blocks receives one bit of a priority grant signal to determine a local priority of arbitration.

16. The IC device of claim 11, wherein the hierarchical arbitration circuitry comprises a configuration data stream generated by programmable logic design software.

17. The IC device of claim 11, wherein the hierarchical arbitration circuitry comprises an IP-core generated by a recursively implemented hardware description language.

18. The IC device of claim 11, wherein an amount of programmable logic used to implement the hierarchical arbitration circuitry is less that an amount of programmable logic used to implement non-hierarchical carry chain arbitration circuitry.

19. A tangible computer-readable medium, comprising instructions to:
 provide a programmable logic interface for an integrated circuit (IC), the programmable logic interface being configured to enable a designer to implement an IC design in programmable-logic of the IC;
 select an arbitration method comprising either hierarchical or non-hierarchical arbitration based on a number of masters in the IC design, weighted arbitration in the IC design, pipelining in the IC design, or a combination thereof; and
 generate an arbitrator scheme based on the selected arbitration method.

20. The tangible computer-readable medium of claim 19, comprising instructions to determine the arbitration method as hierarchical arbitration when 4 or fewer masters are present in the IC design.

21. The tangible computer-readable medium of claim 19, comprising instructions to generate the arbitrator scheme by generating recursive levels of arbitration blocks, each recursive level reducing a number of inputs by half until a single arbitration block is generated on a last level.

22. The tangible computer-readable medium of claim 19, wherein the programmable logic interface is configured enable the designer to specify connections to the masters in the IC design, and wherein the instructions to select the arbitration method are based upon the specified connections.

* * * * *